(12) United States Patent
Kittel et al.

(10) Patent No.: US 7,871,484 B2
(45) Date of Patent: Jan. 18, 2011

(54) METHOD FOR BONDING A DRY FIBER STRIP TO A DRY FIBER STRAND

(75) Inventors: Lucie Kittel, Augsburg (DE); Stefan Utecht, Kaufering (DE)

(73) Assignee: EADS Deutschland GmbH, Munich (DE)

( * ) Notice: Subject to any disclaimer, the term of this patent is extended or adjusted under 35 U.S.C. 154(b) by 259 days.

(21) Appl. No.: 12/146,845

(22) Filed: Jun. 26, 2008

(65) Prior Publication Data
US 2009/0000725 A1 Jan. 1, 2009

(30) Foreign Application Priority Data
Jun. 27, 2007 (DE) .................. 10 2007 029 762

(51) Int. Cl.
| B32B 5/00 | (2006.01) |
| B29C 65/00 | (2006.01) |
| B29C 65/02 | (2006.01) |

(52) U.S. Cl. ............... 156/176; 156/166; 156/285; 156/324; 156/433; 156/436

(58) Field of Classification Search .......... 156/166, 156/176, 285, 324, 433, 436
See application file for complete search history.

(56) References Cited

U.S. PATENT DOCUMENTS

| 3,246,058 A | * | 4/1966 | Voelker .............. 264/46.2 |
| 3,726,751 A | | 4/1973 | Casadevall |
| 3,848,406 A | * | 11/1974 | Tabei et al. ............. 57/229 |
| 4,220,496 A | * | 9/1980 | Carley et al. ............ 156/174 |
| 4,460,633 A | | 7/1984 | Kobayashi et al. |
| 5,753,378 A | * | 5/1998 | Tebbe .................. 428/537.1 |
| 6,401,785 B1 | * | 6/2002 | Van Geijlswijk .......... 156/497 |
| 2003/0051790 A1 | * | 3/2003 | Keil et al. .............. 156/64 |

FOREIGN PATENT DOCUMENTS

| DE | 2 201 334 | 8/1973 |
| DE | 698 14 129 T2 | 4/2004 |
| DE | 103 01 646 A1 | 7/2004 |

* cited by examiner

*Primary Examiner*—Khanh Nguyen
*Assistant Examiner*—Carson Gross
(74) *Attorney, Agent, or Firm*—Crowell & Moring LLP

(57) ABSTRACT

A method and a device are provided for bonding a dry fiber strip to a dry fiber strand in continuous, uninterrupted operation. A bonding agent, activatable by supplying heat, is provided on the fiber strip and the fiber strand, which has at least one flat mantle surface. The fiber strip and the fiber strand are unwound from respective supply rolls, and the flat mantle surface of the fiber strand is positioned on the fiber strip during the unwinding procedure. Heat is supplied during the unwinding procedure to cause activation of the binder and gluing of the fiber strip and the fiber strand.

8 Claims, 3 Drawing Sheets

METHOD FOR BONDING A DRY FIBER STRIP TO A DRY FIBER STRAND

This application claims the priority of German Patent Application DE 10 2007 029 762.0, filed Jun. 27, 2007, the entire disclosure of which is incorporated herein by reference.

BACKGROUND AND SUMMARY OF THE INVENTION

This invention relates to a method for bonding a dry fiber strip to a dry fiber strand and, in general, to the production of fiber-reinforced components made of plastic, in particular for aviation.

FIG. 1 shows the layered construction of profile/stringers made of fiber composite materials (e.g., CRP, GRP, aramid-fiber-reinforced plastic, or combinations of these materials), which requires the use of gussets 2 for aviation applications to form an empty space in T-joints. This gusset 2 has a three-dimensional, typically triangular, and commonly, equilaterally triangular, cross-section.

To produce such a component, the gusset 2 is first applied to the base layer 1 of the component. The invention relates to this bonding of the gusset and the base layer as a partial process in the production method of the overall component. The base layer implemented may be a fiber scrim or fiber fabric, for example.

A tracer thread T is braided into the gusset during its production for unique positioning of the three edges of the gusset 2. This thread identifies the edge of the gusset that points away from the base layer.

Because of the production process of the gusset (braiding of individual thin threads, which themselves in turn comprise parallel or twisted rovings), the gusset may be twisted because of manufacturing, so that it must be untwisted before the processing.

The connection of the gusset and the base layer is currently performed manually. The gusset is cut to the required length from a supply roll in accordance with the dimensions of the component in which the gusset is to be processed. One end of the twisted gusset is fixed on a positioning tool having a triangular groove, so that the tracer thread points into the groove. The gusset is then untwisted manually. Its other end is also subsequently fixed on the positioning tool.

In the next processing step, the gusset and the base layer are bonded. For this purpose, the base layer is laid on the positioning tool. Because the gusset and the base layer are dry components, which are thus not already impregnated using a resin, a bonding agent, e.g., a thermoplastic binder nonwoven, is used to bond the two elements. Other adhesives or binder variants, such as powdered binders, may also be used for fixing the elements, however. One side of the base layer is provided with such a thin binder nonwoven. The gusset is fixed to the base layer by introducing heat, for example by using a heated metal plate ("clothes iron"). The binder nonwoven located on the base layer melts due to the effect of heat and glues the gusset after it cools.

A method for producing a semifinished product made of multiple mats or strips in continuous, uninterrupted operation is described in German document DE 698 14 129 T2. The mats or strips to be bonded are transported via rolls. The bonding is performed by heating and pressure impingement of a bonding agent using heated plate and pressure slides.

German document DE 2 201 334 A describes a method for laminating individual film layers as warps and wefts. The film layers to be bonded are suctioned by a partial vacuum and bonded by electrostatic charge.

Methods for producing planar fibrous semifinished products are known from U.S. Pat. Nos. 3,726,751 A and 4,460,633 A, and from German document DE 103 016 646 A1, in which individual threads or fiber strands are bonded to one another while crossed.

This invention has, as one object, the object of providing a method by which the base layer and the gusset may be bonded more rapidly and cost-effectively. In particular, complex untwisting of the gusset is to be dispensed with.

This object may be achieved by a method for bonding a dry fiber strip to a single dry fiber strand, in an axial direction and in continuous, uninterrupted operation, by way of a bonding agent that is activatable by supplying heat provided on the fiber strip. The fiber strand has at least one flat mantle surface and a three-dimensional cross-section. The fiber strip and the fiber strand are unwound from respective supply rolls, and the fiber strip is fixed on a conveyor belt using suction. The flat mantle surface of the fiber strand is positioned on the fiber strip during the unwinding procedure. The fiber strip and the fiber strand positioned thereon are covered using an air-impermeable film in a suction area to improve the suction effect, and heat is supplied during the unwinding procedure using hot air blowers to cause activation of the binding agent and gluing of the fiber strip and the fiber strand. Advantageous embodiments of the invention are apparent from the subject matter of further claims.

The gusset is also referred to hereafter as a fiber strand, and has a formation like a cord or cable. The base layer is also referred to hereafter as a fiber strip. Because its width is significantly greater than its thickness, it has a planar formation. The width of the fiber strand is, typically, significantly less than the width of the fiber strip, providing a strand-to-strip width ratio of 1:5.

According to one method according to the invention, the bonding of a fiber strip and a fiber strand occurs in a continuous, automated process. The fiber strip and the fiber strand are continuously unwound from their supply rolls, positioned one top of another, and bonded to one another while supplying heat. The fiber strand and the fiber strip both run in a mutual direction, which corresponds to the direction of their main axes. In other words, the fiber strand and the fiber strip do not intersect, but rather run parallel to one another. The bonding is achieved using a bonding agent activatable by supplying heat, which is located on the fiber strip. The heat is supplied using hot air blowers. The bonding agent may be a thermoplastic binder nonwoven, for example. However, other adhesives or binder variants such as powdered binders may also be used.

It is no longer necessary to untwist the fiber strand, because the fiber strand is now processed directly and continuously down from the supply roll (where it is provided in the untwisted state).

The invention has the particular advantages of shortening manufacturing times, making products reproducible, and permitting optimization of positioning tolerances.

According to the invention, the fiber strand and the fiber strip are transported using a conveyor belt, on which the fiber strip and the fiber strand are laid one on top of another. The conveyor belt is air-permeable so that the fiber strand may be fixed on the conveyor belt by suction.

According to the invention, the fiber strip and the fiber strand positioned thereon are covered by an air-impermeable film in the suction area. This improves the suction effect, so that the fiber strip is securely fixed on the conveyor belt. The film clings closely to the external surface of the overall body formed by fiber strip and fiber strand. This effect allows reliable fixing of the fiber strand on the fiber strip, because the fiber strand no longer has lateral movement capability.

An additional measure for positioning and fixing the fiber strand on the fiber strip is to use a mold matrix which forces the fiber strand into the intended position upon passage. The mold matrix may also be heatable for activating the bonding agent (e.g., melting of a binder nonwoven located on the fiber strip).

The advantage of suction with air-impermeable film is that no warpage may occur within the fiber strand during transport. In addition, positioning occurs without wear (no abrasion on components). Moreover, the film may also be made transparent without further measures, so that an improved capability for quality control results, because the correct position of the tracer thread may then be visually monitored.

Overall, the invention combines a heat supply for adhesive activation using a blower, transport on a conveyor belt, positioning/fixing of the fiber strip and the fiber strand by partial vacuum, and coverage of the fiber strip and the fiber strand by an air-impermeable film. This combination results in a very low-contact method, which allows very careful processing of the materials and largely avoids material warpage.

The film may be configured as an endless film, which is unwound from a supply roll before the area for supplying heat and received on a rollup roll passing the area for supplying heat.

The fiber strip and the fiber strand may be made from typical fiber materials, such as carbon fibers, glass fibers, or aramid fibers. The fiber strip and the fiber strand may also include different fiber materials.

Embodiments of the invention are explained in greater detail hereafter with reference to the drawings.

DETAILED DESCRIPTION OF THE INVENTION

Figure 1:
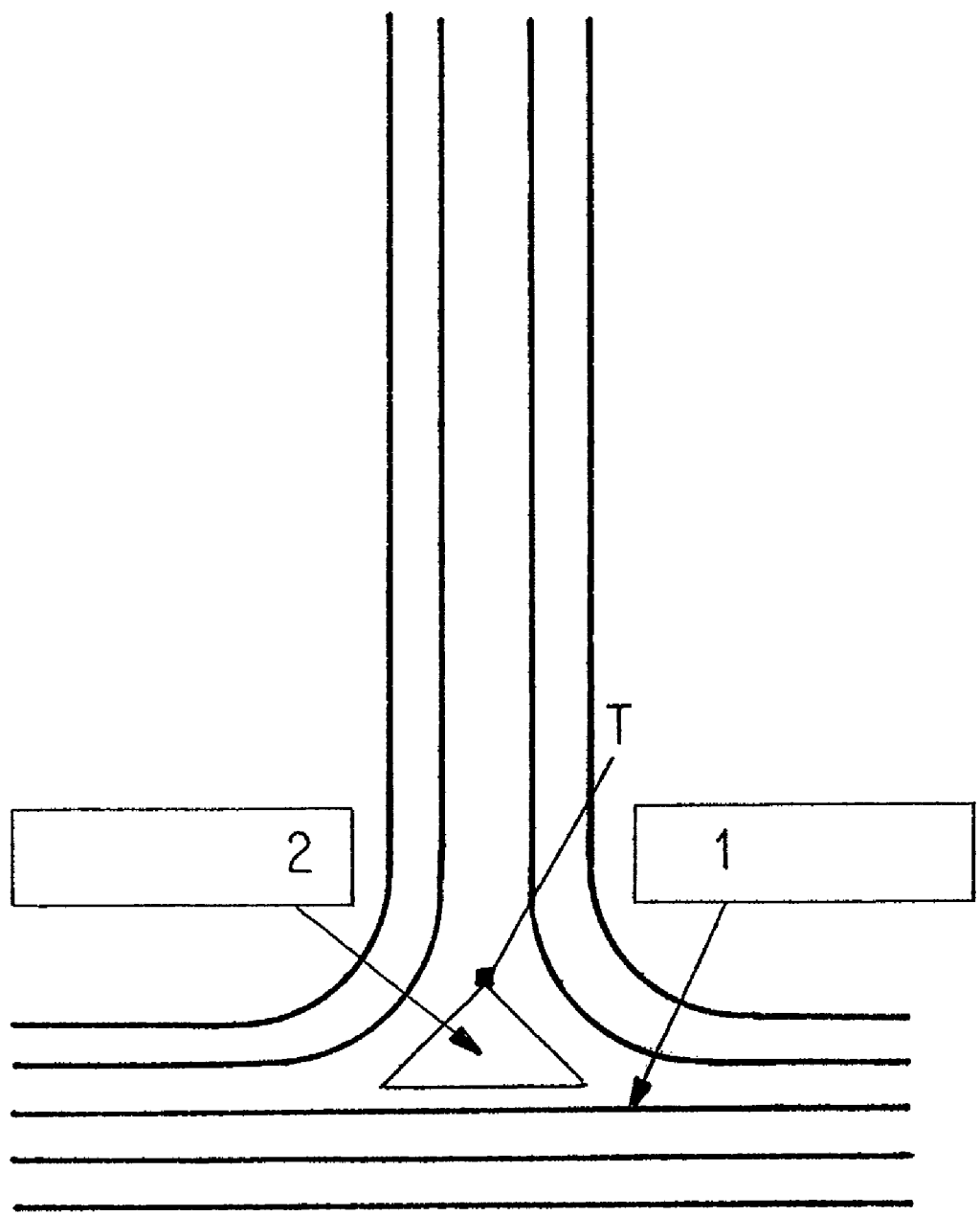
FIG. 1 shows a schematic drawing of the construction of a fiber composite component using a gusset, as already described.

FIG. 1 shows an example of the use of a fiber strand 2 in the construction of a fiber composite component, which is to fill up an empty space inside that construction (at a T-joint here). The fiber strand has a three-dimensional cross-section and may be made triangular, round, or oval, for example. Of course, other shapes are also possible, depending on the empty space to be filled up. The gusset results by braiding individual rovings.

Figure 2:
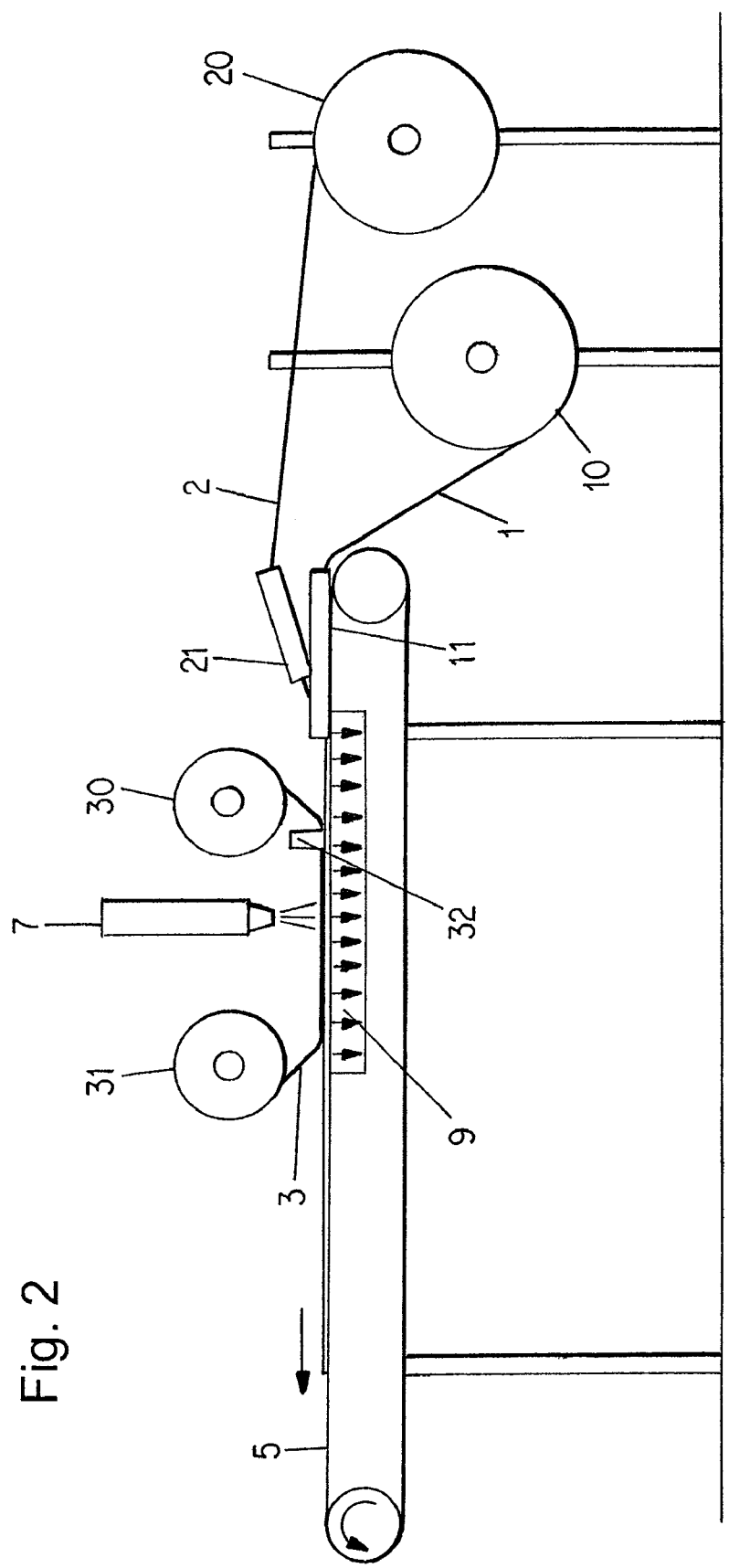
FIG. 2 shows a schematic illustration of a device for performing the method according to the invention.

FIG. 2 shows a device for performing the method according to the invention for bonding the fiber strip 1 and the fiber strand 2, which are both implemented as endless materials. The fiber strip 1 and the fiber strand 2 are each wound on a respective supply roll 10, 20, with a bonding agent, such as a thin thermoplastic binder nonwoven here, being applied to the fiber strip. The unwinding and transport of the fiber strip 1 (having bonding agent present thereon) and the fiber strand 2 is implemented using an air-permeable, revolving conveyor belt 5, which may be made of felt. The fiber strip 1 and the fiber strand 2 are guided via positioning elements 11, 21 on the conveyor belt 5 from the supply rolls. Guiding and positioning of the fiber strip 1 is performed in this embodiment via guide plates 11, while the fiber strand 2 is guided along a positioning matrix 21. In addition, further guide elements, such as a hold-down device, which presses the fiber strand on the fiber strip, may be provided.

After passing the positioning elements 11, 21, the fiber strip 1 and the fiber strand 2 reach the suction area of a suction blower, by which the fiber strip 1 is fixed on the conveyor belt 5. The suction area is implemented by the suction boxes 9 of the blower, which are provided with openings and are located below the conveyor belt 5. The suction occurs through the conveyor belt 5. The fiber strand 2 lies on the fiber strip 1 in accordance with its setpoint position, predefined by the guide elements 11, 21.

To improve the suction effect and to securely fix the fiber strand 2 on the fiber strip 1, an air-impermeable and heat-resistant film 3 is introduced in the suction area. The film covers the fiber strip 1 having the fiber strand 2 located thereon. The film 3 is pressed onto the surface of the fiber strip 1 and the fiber strand 2 by the suction so that the fiber strand 2 is fixed securely on the fiber strip 1.

Figure 3:
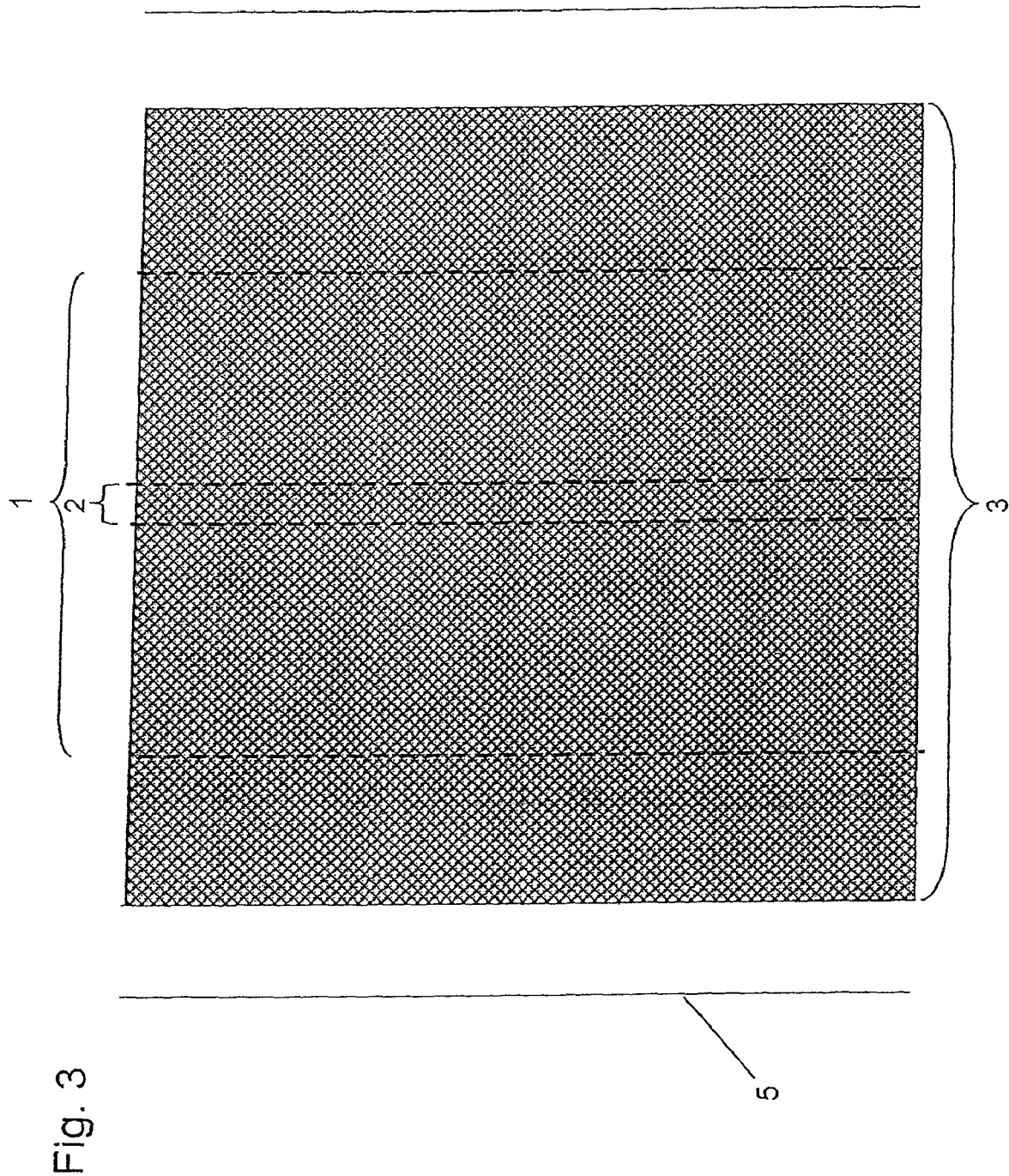
FIG. 3 is a top view of a conveyor belt having a fiber strip, a fiber strand, and an airtight film located thereon.

FIG. 3 shows a top view of the device for performing the method according to the invention. The conveyor belt 5, made of felt and on which the fiber strip 1 is fixed by suction, is shown. The fiber strand 2 is positioned on the fiber strip 1. The fiber strip 1 and the fiber strand 2 are covered by the air-impermeable, transparent film 3.

After the fiber strand 2 and the fiber strip 1 have been positioned and fixed on the conveyor belt 5 and secured one on top of another, they pass through the area for supplying heat. According to the invention, a hot air blower 7 is used for this purpose and melts the thermoplastic adhesive of the binder nonwoven, which is located on the fiber strip 1. The fiber strip 1 and the fiber strand 2 are thus permanently bonded.

The transparent film 3 is unwound from a supply roll 30 situated before the area for supplying heat (viewed in the direction of the material flow). Using a rollup roll 31, which is located after the area for supplying heat (viewed in the direction of the material flow), the film 3 is received again and may be supplied for reuse. Using the hold-down device 32, the film 3 is forced into a position which lies closely over the surface of the fiber strip 2 to make suction of the film 3 easier.

The fiber strip 1 and the fiber strand 2, now bonded permanently thereto, leave the device and may be processed further directly, for example by being cut to the required lengths. The formation thus resulting, made of fiber strand and fiber strip, is a three-dimensional formation, in contrast to a flat, layered formation.

Due to the suction of the materials onto the conveyor belt, no further drive is necessary for the transport of the fiber strand and the fiber strip in addition to the drive of the conveyor belt itself.

The construction of the device ensures that the materials to be bonded are always positioned one on top of another in a defined way.

A continuous and completely automatic operation for bonding the fiber strip and the fiber strand is achieved according to the invention. The speed of the materials to be bonded may be in the range of 20 to 50 m per hour, for example.

It is also within the scope of the invention to have the fiber strip be multilayered. In this case, the individual layers may be unwound from separate rolls. The bonding between the fiber strip and the fiber strand is performed on the uppermost layer of the fiber strip. Because the individual layers are each provided with a bonding agent, e.g., a binder nonwoven, heat introduction also ensures permanent bonding of the individual layers of the fiber strip to one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for bonding a dry fiber strip to a single dry fiber strand, in an axial direction and in continuous, uninterrupted operation, by way of a bonding agent that is activatable by supplying heat being provided on the fiber strip, with the fiber strand having a three dimensional cross section and at least one flat mantle surface, comprising:

unwinding the fiber strip and the fiber strand from respective supply rolls, fixing the fiber strip on a conveyor belt using suction, positioning the flat mantle surface of the fiber strand on the fiber strip during the unwinding procedure, unwinding an air-impermeable film from a supply roll, covering the fiber strip and the fiber strand positioned thereon using said air-impermeable film in a suction area so as to improve an effect of the suction used to fix the fiber strip on the conveyor belt, supplying heat to the air-impermeable film, the fiber strip, and the fiber strand in a heating area using hot air blowers to cause activation of the binding agent and gluing of the fiber strip and the fiber strand, and receiving the air-impermeable film on a rollup roll disposed in a location after said heating area.

2. The method according to claim 1, wherein unwinding of the fiber strand and the fiber strip is caused using the conveyor belt.

3. The method according to claim 1, wherein the fiber strip is multilayered, and wherein each individual layer of the fiber strip is unwound from a supply roll.

4. The method according to claim 1, wherein positioning of the fiber strip and the fiber strand is performed using matrices, guide plates, or both matrices and guide plates.

5. The method according to claim 2, wherein the fiber strip is multilayered, and wherein each individual layer of the fiber strip is unwound from a supply roll.

6. The method according to claim 2, wherein positioning of the fiber strip and the fiber strand is performed using matrices, guide plates, or both matrices and guide plates.

7. The method according to claim 3, wherein positioning of the fiber strip and the fiber strand is performed using matrices, guide plates, or both matrices and guide plates.

8. The method according to claim 5, wherein positioning of the fiber strip and the fiber strand is performed using matrices, guide plates, or both matrices and guide plates.

\* \* \* \* \*